United States Patent [19]

Okada

[11] Patent Number: 5,031,988
[45] Date of Patent: Jul. 16, 1991

[54] FIBER OPTIC GYRO

[75] Inventor: Kenichi Okada, Tokyo, Japan

[73] Assignee: Japan Aviation Electronics Industry Limited, Tokyo, Japan

[21] Appl. No.: 607,455

[22] Filed: Oct. 31, 1990

[30] Foreign Application Priority Data

Nov. 7, 1989 [JP] Japan .................................. 1-289776

[51] Int. Cl.⁵ .......................... G02B 6/26; G01B 9/02; G01D 5/34
[52] U.S. Cl. ............................. 350/96.15; 350/96.29; 356/350; 250/231.12
[58] Field of Search ............... 350/96.15, 96.16, 96.29, 350/96.30; 356/345, 349, 350; 250/227.11, 231.12

[56] References Cited

U.S. PATENT DOCUMENTS

| | | | |
|---|---|---|---|
| 4,529,312 | 7/1985 | Pavlath et al. | 356/350 |
| 4,545,682 | 10/1985 | Greenwood | 356/350 |
| 4,662,751 | 5/1987 | Goss et al. | 356/350 |
| 4,779,975 | 10/1988 | Kim | 356/345 |
| 4,842,358 | 6/1989 | Hall | 350/96.15 |
| 4,887,900 | 12/1989 | Hall | 356/350 |
| 4,906,096 | 3/1990 | Pavlath | 356/350 |

Primary Examiner—Brian Healy

[57] ABSTRACT

In a fiber optic gyro of a zero serrodyne system employing a linear ramp voltage, a phase difference is provided, by a rectangular biasing voltage of a fixed period, between two rays of light which propagate through an optical fiber coil in opposite directions. Interference light of the two rays of light is detected and the detected output is synchronously detected by the biasing voltage in a synchronous detector. A positive increment and a negative increment in the synchronously detected output are detected by a positive increment detector and a negative increment detector, respectively. The positive and negative increments thus detected are added together by an adder, and based on the added output, a ramp voltage generator is controlled so that a maximum ramp phase shift which is applied to the two rays of light may be an integral multiple of $2\pi$ rad.

4 Claims, 8 Drawing Sheets

FIBER OPTIC GYRO

BACKGROUND OF THE INVENTION

The present invention relates to a fiber optic gyro of a zero serrodyne modulation system employing a linear phase ramp voltage.

There has been proposed a wide-dynamic-range, low-drift fiber optic gyro of the type having a biasing phase modulator and a ramp phase modulator connected to the one and the other end of an optical fiber coil, respectively. The biasing phase modulator and the ramp phase modulator each comprises a pair of electrodes formed in association with an optical waveguide. A biasing voltage and a ramp voltage are applied to the biasing phase modulator and the ramp phase modulator, respectively, to thereby provide a phase difference between two rays of light propagating through the optical fiber coil in opposite directions. The phase difference between the two rays of light which propagate through the optical fiber coil and interfere with each other is detected from the output of a photodetector. The detected output is used to control the polarity and frequency of the ramp voltage so that the phase difference may assume a predetermined value.

FIG. 1 shows an example of such a conventional fiber optic gyro of the zero serrodyne modulation system utilizing a linear ramp voltage.

Light 10 emitted from a light source 11 is provided via an optical coupler 13 and a polarizer 14 to an optical coupler 15, wherein it is split into two rays of light 5a and 5b. The one light 5a and the other light 5b are supplied to an optical fiber coil 17 at the one and the other end 17a and 17b thereof, respectively, and propagate therethrough as right-handed light and left-handed light. The two rays of light 7a and 7b having thus propagated through the optical fiber coil 17 are supplied therefrom at the ends 17b and 17a to the optical coupler 15, wherein they interfere with each other. The resulting interference light 9 is provided via the polarizer 14 and the optical coupler 13 to a photodetector 19 for conversion into an electric signal as in ordinary fiber optic gyros.

A biasing phase modulator 21 is disposed between the optical coupler 15 and the one end 17a of the optical fiber coil 17 and a ramp phase modulator 22 is disposed between the optical coupler 15 and the other end 17b of the optical fiber coil 17. A biasing voltage Bi is applied from a signal generator 30 to the biasing phase modulator 21 for phase shifting the light 5a to be supplied to the optical fiber coil 17 at the one end 17a thereof and the light 7b having propagated through the optical fiber coil 17 from the other end 17b thereof and to be supplied to the optical coupler 15. On the other hand, a ramp voltage Ra is applied from a ramp voltage generator 40 to the ramp phase modulator 22 for phase shifting the light 5b to be supplied to the optical fiber coil 17 at the other end 17b thereof and the light 7a having propagated through the optical fiber coil 17 from the one end 17a thereof and to be supplied to the optical coupler 15. The light 7a and the light 7b are combined by the optical coupler 15 into the interference light 9, which is provided to the photodetector 19. The output Va of the photodetector 19 is supplied to a phase difference detect/control unit 50, which detects from the detected output Va applied thereto the total phase difference $\Delta\phi$ between the light 7a and the light 7b interfering with each other in the optical coupler 15 and outputs a voltage Ve corresponding to the detected phase difference $\Delta\phi$. The output Ve of the phase difference detect/control unit 50 is provided to the ramp voltage generator 40 to control the polarity and frequency of the ramp voltage Ra from the ramp voltage generator 40 so that the detected total phase difference $\Delta\phi$ may reach a predetermined value. That is, the remainder which results from subtracting, from the phase difference $\Delta\phi$, a phase difference $\Delta\phi_B$ which is caused by the application of the biasing voltage Bi to the biasing phase modulator 21 is the sum $\Delta\phi_0$ of a Sagnac phase difference $\Delta\phi_s$ which is caused by the application of an input angular rate $\Omega$ to the optical fiber coil 17 and a ramp phase difference $\Delta\phi_r$ which is caused by the application of the ramp voltage Ra to the ramp phase modulator 22, that is, $\Delta\phi_0 = \Delta\phi_s + \Delta\phi_r$, and the polarity and frequency of the ramp voltage Ra is controlled so that the above-mentioned sum $\Delta\phi_0$ may be zero or an integral multiple of $2\pi$ rad.—zero, in general.

The biasing voltage Bi is a sinusoidal or rectangular voltage of a frequency fm ($=\frac{1}{2}\tau$, where $\tau$ is the time necessary for the propagation of the two rays of lights 5a and 5b through the optical fiber coil 17). The phase modulation by the biasing phase modulator 21 supplied with such a biasing voltage is to set an operating point of the fiber optic gyro by providing the phase difference $\Delta\phi_B$ of $\pm\pi/2$ rad. between the two rays of light 7a and 7b which have propagated through the optical fiber coil 17 and interfere with each other. For example, where the biasing voltage Bi is a square voltage of an amplitude $\pm V_s$, the light 5a which is subjected to a phase shift $+\pi/4$ (or $-\pi/4$) by the voltage $+V_s$ (or $-V_s$) in the phase modulator 21 and is then applied to the optical fiber coil 17 is emitted therefrom as the light 7a after the lapse of time $\tau$. On the other hand, when the light 5b entered the optical fiber coil 17 simultaneously with the light 5a is applied to the phase modulator 21 after the lapse of time $\tau$, the biasing voltage Bi has changed to $-V_s$ (or $+V_s$), and hence the light 5b is subjected to a phase shift $-\pi/4$ (or $+\pi/4$), thereafter being output as the light 7b. Accordingly, the phase difference which is provided between the light 7a and the light 7b is $+\pi/2$ (or $-\pi/2$). The same is true of the case of employing a sinusoidal voltage.

The ramp voltage Ra goes positive or negative as depicted in FIG. 2. The phase modulation by the ramp phase modulator 22 supplied with such a ramp voltage provides the ramp phase difference $\Delta\phi_r$, which is a maximum of $2k\pi$ rad. (where $k = \pm 1, \pm 2, ...$), generally, up to $\pm 2\pi$ rad., between the two rays of light 7a and 7b which have propagated through the optical fiber coil 17 and interfere with each other. That is intended to cancel the Sagnac phase difference $\Delta\phi_s$ so that $\sin(\Delta\phi_s + \Delta\phi_r) = 0$, as referred to previously.

The phase difference $\Delta\phi_0$ remaining after subtracting the phase difference $\Delta\phi_B$, which is caused by the application of the biasing voltage Bi to the biasing phase modulator 21, from the total phase difference $\Delta\phi$ between the two rays of light 7a and 7b which interfere with each other in the optical coupler 15 is expressed as follows:

$$\left.\begin{array}{l} \Delta\phi = \Delta\phi_B + \Delta\phi_0 \\ \Delta\phi_0 = \Delta\phi_s + \Delta\phi_r \end{array}\right\} \quad (1)$$

As is well-known in the art, the Sagnac phase difference $\Delta\phi_s$ is given by $$\Delta\phi_s = \frac{4\pi RL}{\lambda C} \quad (2)$$

where R is the radius of the optical fiber coil 17, L is the length of the optical fiber coil 17, $\lambda$ is the wavelength of light 7a, 7b which propagates through the optical fiber coil 17, and C is the velocity of light in a vacuum.

In the ramp phase modulator 22 the light 5b which is supplied to the optical fiber coil 17 at its one end 17b is subjected to a phase shift $\phi_b$ corresponding to a value of the ramp voltage Ra at that time. These phase shifts $\phi_a$ and $\phi_b$ may hereinafter be referred to as ramp phase shifts and representatively denoted by $\phi_R$. The light 5a which is input into the optical fiber coil 17 at the other end 17a is supplied via the one end 17b thereof, after the lapse of time $\tau$, to the ramp phase modulator 22, wherein it is subjected to a phase shift $\phi_a$ corresponding to a value of the ramp voltage Ra at that time. When the input angular rate $\Omega$ is applied clockwise and the Sagnac phase difference $\Delta\phi_s$ goes negative, the ramp voltage Ra is controlled to be positive by the output Ve of the phase difference detect/control unit 50 as shown at the left-hand side in FIG. 2. In this instance, the phase shifts $\phi_a$ and $\phi_b$ bear such a relationship as shown at the left-hand side in FIG. 3. In consequence, the ramp phase difference $\Delta\phi_r = \phi_a - \phi_b$ resulting from the application of the ramp voltage Ra to the ramp phase modulator 22 goes positive in a period Pa and negative in a period Pb as depicted at the left-hand side in FIG. 4. Where the input angular rate $\Omega$ is applied counterclockwise and the Sagnac phase difference $\Delta\phi_s$ goes positive, the ramp voltage Ra is made negative by the output Ve of the phase difference detect/control unit 50 as shown at the right-hand side in FIG. 2 and the phase shifts $\phi_a$ and $\phi_b$ bear such a relationship as depicted at the right-hand side in FIG. 3. As a result of this, the ramp phase difference $\Delta\phi_r$ goes negative in the period Pa and positive in the period Pb as shown at the right-hand side in FIG. 4.

Accordingly, as will be seen from FIG. 3, letting the period and frequency of the ramp voltage Ra be represented by T and $f_R$, respectively, the ramp phase difference $\Delta\phi_r$ indicated by the arrow becomes, in the period Pa, as follows:

$$\Delta\phi_r = 2k\pi \frac{\tau}{T} = 2k\pi \cdot \tau f_R \quad (3)$$

Letting the refractive index of the optical fiber coil 17 be represented by n, the following relationship exists:

$$\tau = \frac{nL}{C} \quad (4)$$

Hence, substitution of Eq. (4) into Eq. (3) gives the following equation:

$$\Delta\phi_r = 2k\pi \frac{nL}{C} f_R \quad (5)$$

By controlling the polarity and the frequency $r_R$ of the ramp VOltage Ra so that the phase difference $\Delta\phi_0$ expressed by Eq. (1) may be reduced to zero, that is, $$\Delta\phi_r = -\Delta\phi_s \quad (6)$$

the frequency $f_R$ is obtained from Eqs. (5) and (6) as follows:

$$\begin{aligned} f_R &= \frac{C}{2k\pi \cdot nL} \Delta\phi_r \\ &= -\frac{C}{2k\pi \cdot nL} \Delta\phi_s \\ &= -\frac{C}{2k\pi \cdot nL} \cdot \frac{4\pi RL}{\lambda C} \Omega \\ &= -\frac{2R}{kn\lambda} \Omega \end{aligned} \quad (7)$$

Accordingly, the angular rate $\Omega$ applied to the optical fiber coil 17 is expressed as follows:

$$\Omega = -\frac{kn\lambda}{2R} f_R \quad (8)$$

Whereas, in the case where the input angular rate $\Omega$ is applied clockwise, i.e. in the negative direction and the ramp voltage Ra goes positive, k becomes +1, and in the case where the input angular rate $\Omega$ is applied counterclockwise, i.e. in the positive direction and the ramp voltage Ra goes negative, k becomes −1. In this way, the direction and the magnitude of the input angular rate $\Omega$ can be measured from the polarity and the frequency $f_R$ of the ramp voltage Ra. Incidentally, the coefficient $(kn\lambda/2R)$ in Eq. (8) is called a scale factor and is the measurement sensitivity that is expressed by an angular rate per cycle of the ramp voltage ($\Omega/f_R$).

The ramp phase modulator 22 such as described in the foregoing usually includes optical waveguide formed as by diffusing titanium into an electro-optic crystal as of lithium niobate and a pair of electrodes for receiving a voltage for modulation. The ramp phase modulator 22 is connected in series to the other end 17b of the optical fiber coil 17. The amount of phase shift of the light in the phase modulator is proportional to the product, $\gamma V_p$, of the electro-optic constant $\gamma$ of the electro-optic crystal and the applied voltage $V_p$. The electro-optic constant $\gamma$ is temperature-dependent and has a temperature coefficient of about 500 ppm/° C. though it somewhat differs with the cutting direction of the electro-optic crystal. Consequently, the amount of phase shift of light in the phase modulator varies with temperature, even if the applied voltage Vp remains unchanged.

In the conventional fiber optic gyro described above in respect of FIG. 1 the peak-to-peak value or maximum amplitude of the ramp voltage Ra which is applied from the ramp voltage generator 40 to the ramp phase modulator 22 is set to such a fixed value that a maximum phase shift of light by the maximum amplitude may be $2k\pi$rad. at a specified temperature, say, 15° C. However, in the case where the temperature of the fiber optic gyro and consequently the temperature of the ramp phase modulator 22 differs from the above-said specified temperature due to a change in ambient temperature, the electro-optic constant $\gamma$ of the electro-optic crystal forming the ramp phase modulator 22 changes accordingly, by which the maximum phase shift deviates from $2k\pi$rad., and consequently, the relationship between the input angular rate $\Omega$ and the frequency $f_R$ of the ramp voltage Ra deviates from the relationship defined by Eq. (7) or (8), resulting in a scale factor error in the output of the fiber optic gyro.

FIG. 5 shows measured values of the scale factor error in the conventional fiber optic gyro in which the peak value of the ramp voltage Ra was set such that the maximum phase shift at 15° C. would be ±2πrad. When the temperature of the fiber optic gyro is ±70° C. relative to 15° C., the maximum phase shift will deviate about ±3.5% from 2πrad. and the scale factor error will be as large as ±0.13% or so.

SUMMARY OF THE INVENTION

It is therefore an object of the present invention to provide a fiber optic gyro of a zero serrodyne modulation system employing a linear phase ramp voltage, in which the scale factor error in its output by a change in the constant of the ramp phase modulator owing to a temperature change is appreciably small over the entire temperature range.

According to the present invention, a rectangular voltage is used as the biasing voltage and a peak value controller is provided for controlling the peak value of the ramp voltage which is used for providing the ramp phase modulation. The peak value controller includes a synchronous detector for synchronously detecting the output of a photodetector by the biasing voltage or a rectangular signal of the same frequency as that of the biasing voltage, a positive increment detector for detecting a positive increment in the output of the synchronous detector, a negative increment detector for detecting a negative increment in the output of the synchronous detector, and an adder for adding the outputs of the positive and negative increment detectors. The peak value controller controls, by the output of the adder, the peak value of the ramp voltage so that the maximum phase shift of light in the ramp phase modulator may be an integral multiple of 2πrad.

In the fiber optic gyro of the present invention, since a rectangular voltage is used as the biasing voltage for phase modulation use, the biasing phase modulator performs a binary phase modulation which provides positive or negative phase difference of a predetermined value between two rays of light having propagated through the optical fiber coil and interfering with each other. If the maximum phase shift of light in the ramp phase modulator deviates from 2kπrad. (where k=±1, ±2, ...) due to a change in the constant of the ramp phase modulator by a temperature change, the intensity of the interference light available from the optical coupler varies with the direction and magnitude of the deviation, the sign of the phase difference caused by the application of the ramp voltage to the ramp phase modulator, and the sign of the phase difference caused by the application of the biasing voltage to the biasing phase modulator. The interference light is detected by the photodetector and the detected output is synchronously detected in the synchronous detector of the peak value controller by the biasing voltage or a rectangular signal of the same frequency as that of the biasing voltage. By this, the direction and magnitude of the deviation of the maximum phase shift of light in the ramp phase modulator from 2kπrad. and a positive or negative increment dependent on the sign of the ramp phase difference caused by the application of the ramp voltage to the ramp phase modulator are obtained.

In the peak value controller the positive and negative increments in the output of the synchronous detector are detected by the positive and negative increment detectors, respectively, and are added by the adder. The peak value of the ramp voltage for phase modulation which is applied to the ramp phase modulator is controlled by the output of the adder so that the maximum phase shift of light in the ramp phase modulator may be 2kπrad. Consequently, the maximum phase shift of light in the ramp phase modulator is held at 2kπrad. over the entire temperature range and the scale factor error which is incurred in the output of the fiber optic gyro by a change in the constant of the ramp phase modulator owing to a temperature change is markedly reduced over the entire temperature range.

DESCRIPTION OF THE PREFERRED EMBODIMENTS

Figure 6:
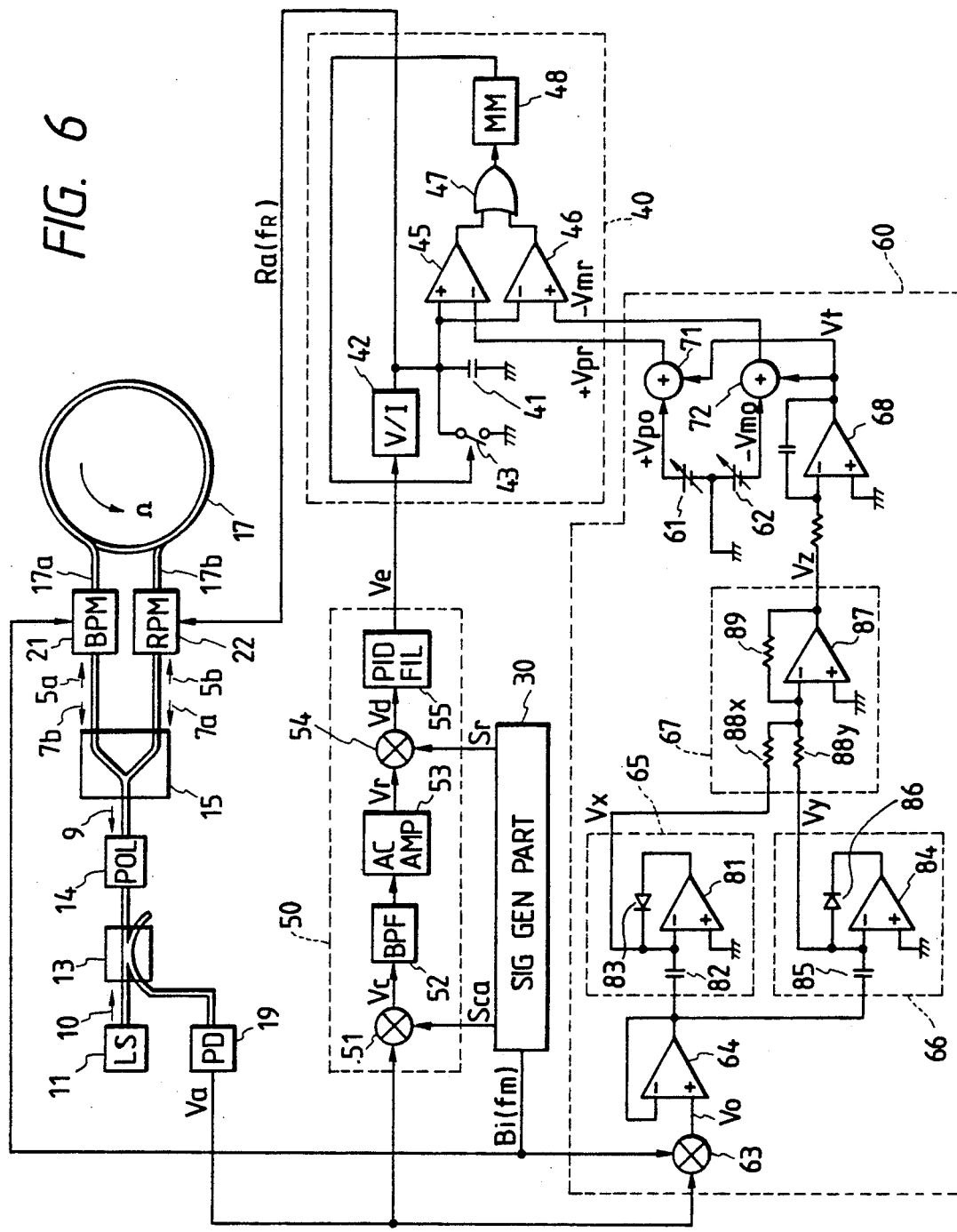
FIG. 6 is a block diagram illustrating an example of the fiber optic gyro of the present invention.

FIG. 6 illustrates in block form an example of the fiber optic gyro of the present invention.

Figure 1:
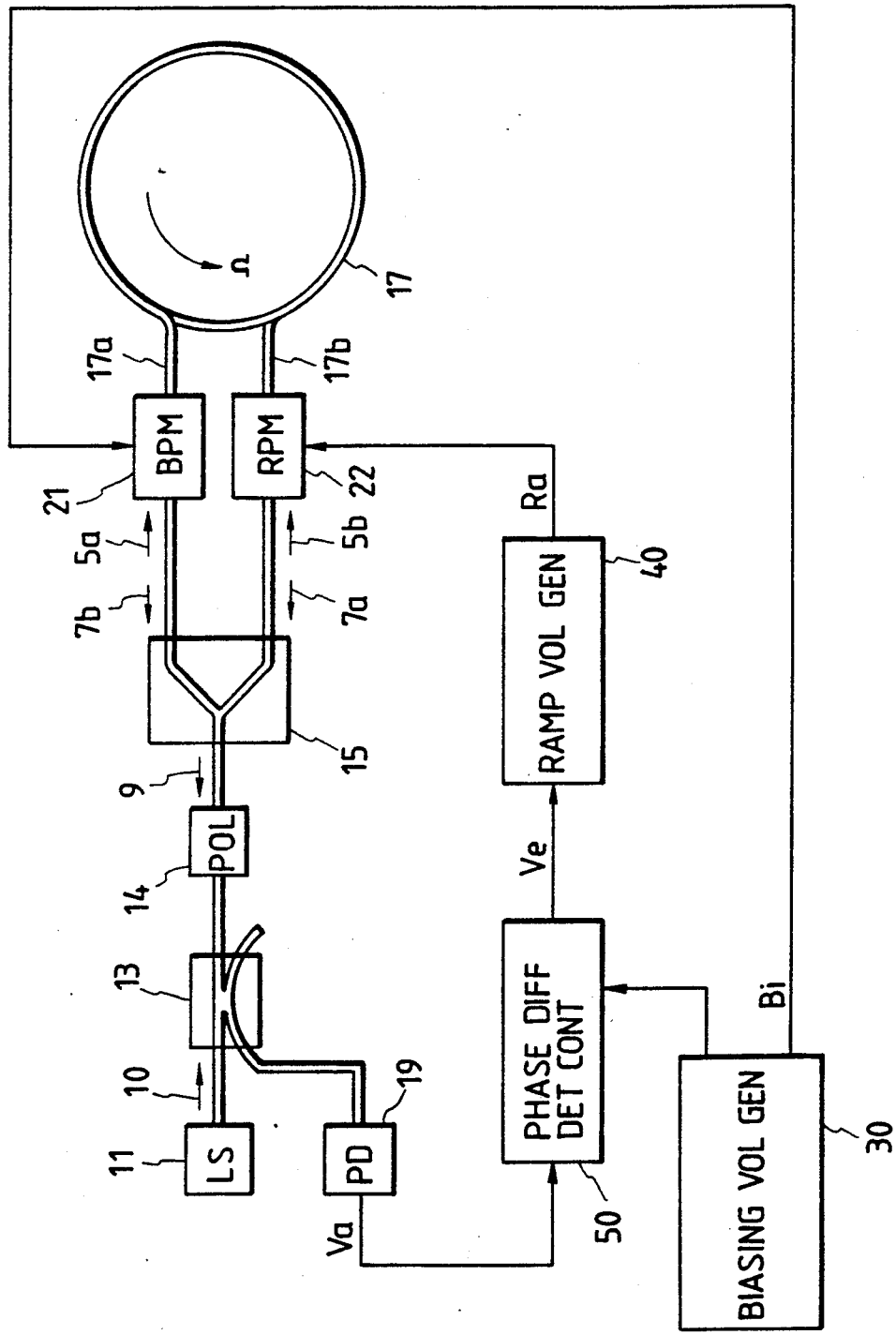
FIG. 1 is a block diagram showing an example of a conventional fiber optic gyro.
Figure 7:
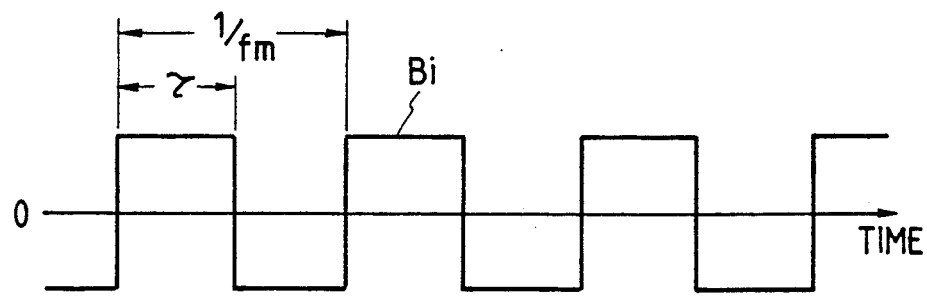
FIG. 7 is a waveform diagram showing a biasing voltage.

As is the case with the conventional fiber optic gyro depicted in FIG. 1, the fiber optic gyro of the present invention also includes the light source 11, the optical coupler 13, the polarizer 14, the optical coupler 15, the optical fiber coil 17, the photodetector 19, the biasing phase modulator 21, the ramp phase modulator 22, the signal generator 30 forming the biasing voltage generator, the ramp voltage generator 40 and the phase difference detect/control unit 50. The operation of this fiber optic gyro is also identical with the operation of the conventional fiber optic gyro except in that the peak value of the ramp voltage Ra is controlled as described later on. The biasing voltage Bi used in this example is a rectangular voltage of a frequency $f_m$ the half period of which corresponds to the time $\tau$ necessary for the propagation of the two rays of light 5a and 5b through the optical fiber coil 17, that is, $2\tau = 1/f_m$, as shown in FIG. 7.

The ramp voltage generator 40 in this example is made up of: a capacitor 41; a voltage-current converter 42 whereby the output voltage Ve of the phase difference detect/control unit 50, which is the input voltage to the ramp voltage generator 40, is converted into a current for input into the capacitor 41; a switch 43 for discharging therethrough the capacitor 41; a voltage comparator 45 for comparing the charging voltage of the capacitor 41 with a positive reference voltage +Vpr; a voltage comparator 46 for comparing the charging voltage of the capacitor 41 with a negative reference voltage −Vmr; an OR gate 47 for obtaining the OR of the outputs of the voltage comparators 45 and 46; and a monostable multivibrator 48 which is triggered by the output of the OR gate 47 to turn ON the switch 43. When the output voltage Ve of the phase difference detect/control unit 50 goes positive, the capacitor 41 is charged positive, and when the charging voltage reaches the reference voltage +Vpr, the output of the voltage comparator 45 and consequently the output of the OR gate 47 goes high, triggering the monostable multivibrator 48. As a result of this, the switch 43 is turned ON for a short period of time, during which the capacitor 41 is discharged, and thereafter the capacitor 41 is charged again. By repeating this operation, a positive ramp voltage whose peak value is equal to the reference voltage +Vpr is developed, as the ramp voltage Ra, across the capacitor 41. When the output voltage Ve of the phase difference detect/control unit 50 goes negative, the capacitor 41 is charged negative, and when the charging voltage reaches the reference voltage −Vmr, the output of the voltage comparator 46 and consequently the output of the OR gate 47 goes high, triggering the monostable multivibrator 48. In consequence, the switch 43 is turned ON for a short period of time, during which the capacitor 41 is discharged, and thereafter the capacitor 41 is charged again. By repeating this operation, a negative ramp voltage whose peak value is equal to the reference voltage −Vmr is developed, as the ramp voltage Ra, across the capacitor 41.

The switch 43 is formed by a switching element which is sufficiently small in its leak current in the OFF state and in its resistance in the ON state, such as a field effect transistor. The time constant of the monostable multivibrator 48 is set so that the time during which the switch 43 is held in the ON state, that is, the flyback time of the ramp voltage is sufficiently reduced.

In the phase difference detect/control unit 50 the output Va of the photodetector 19 is applied to a frequency mixer 51, wherein it is mixed with a local signal Sca of a frequency fca=fm+fr which is higher than the frequency fm of the biasing voltage by a frequency fr which is sufficiently lower than the frequency fm. Consequently, the frequency mixer 51 provides its output Vc which contains a component Vr of the frequency fr converted from a component of the frequency fm in the output Va of the photodetector 19 and a component of a frequency fcb=fm−fr converted from a component of a frequency 2fm in the output Va of the photodetector 19. The output Vc of the frequency mixer 51 is applied to a band-pass filter 52 whose center frequency is fr, and from which is obtained only the component Vr of the frequency fr, that is, the component of the intermediate frequency fr converted from the component of the frequency fm in the output Va of the photodetector 19. The component Vr of the frequency fr, which is the output of the band-pass filter 52, is amplified by an AC amplifier 53 to a sufficient level and is then provided to a synchronous detector 54, wherein it is synchronously detected by a reference signal Sr of the frequency fr available from the signal generator 30 and from which the following detected output is obtained as will be described later:

$$Vd = Kd \cdot \sin\Delta\phi_0 \qquad (9)$$

where Kd is a constant. The output Vd of the synchronous detector 54 is applied to a PID (Proportional plus Integral plus Derivative) filter 55. The output Ve of the PID filter 55 is provided, as the output of the phase difference detect/control unit 50, to the ramp voltage generator 40, wherein the polarity and the frequency $f_R$ of the ramp voltage Ra are automatically controlled by the feedback loop so that Vd expressed by Eq. (9) may be reduced to zero.

Figure 4:
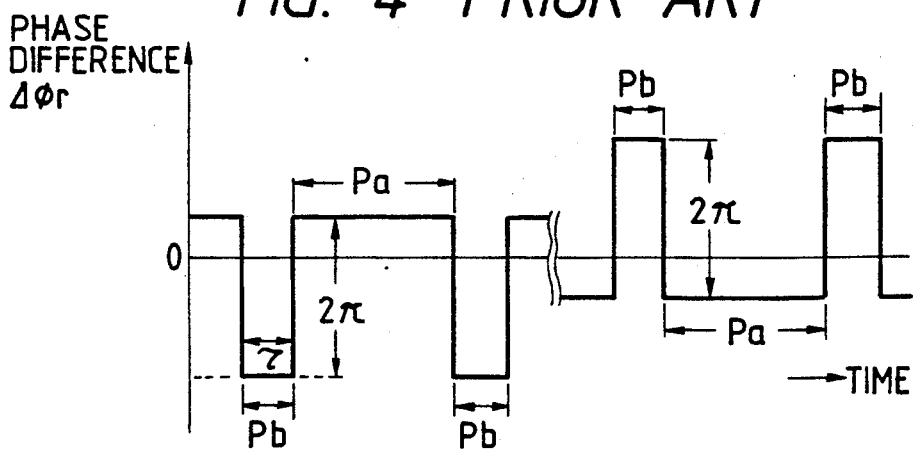
FIG. 4 is a diagram showing a total phase difference provided between the two rays of light through ramp phase modulation.
Figure 5:
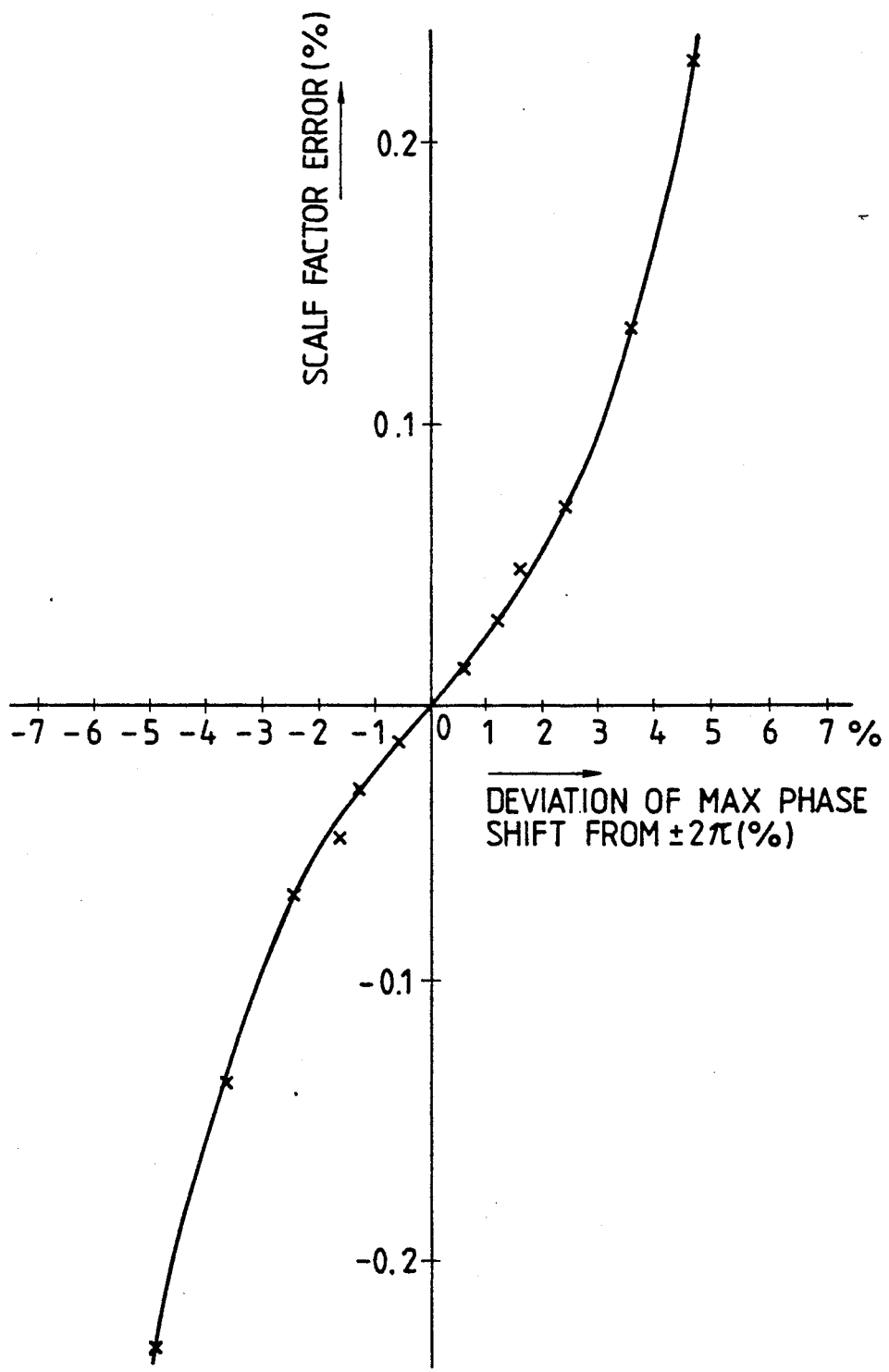
FIG. 5 is a diagram showing the relationship of a scale factor error in the output of the fiber optic gyro to a deviation of the maximum phase shift of light from ±2πrad. ;by the ramp phase modulator.
Figure 8:
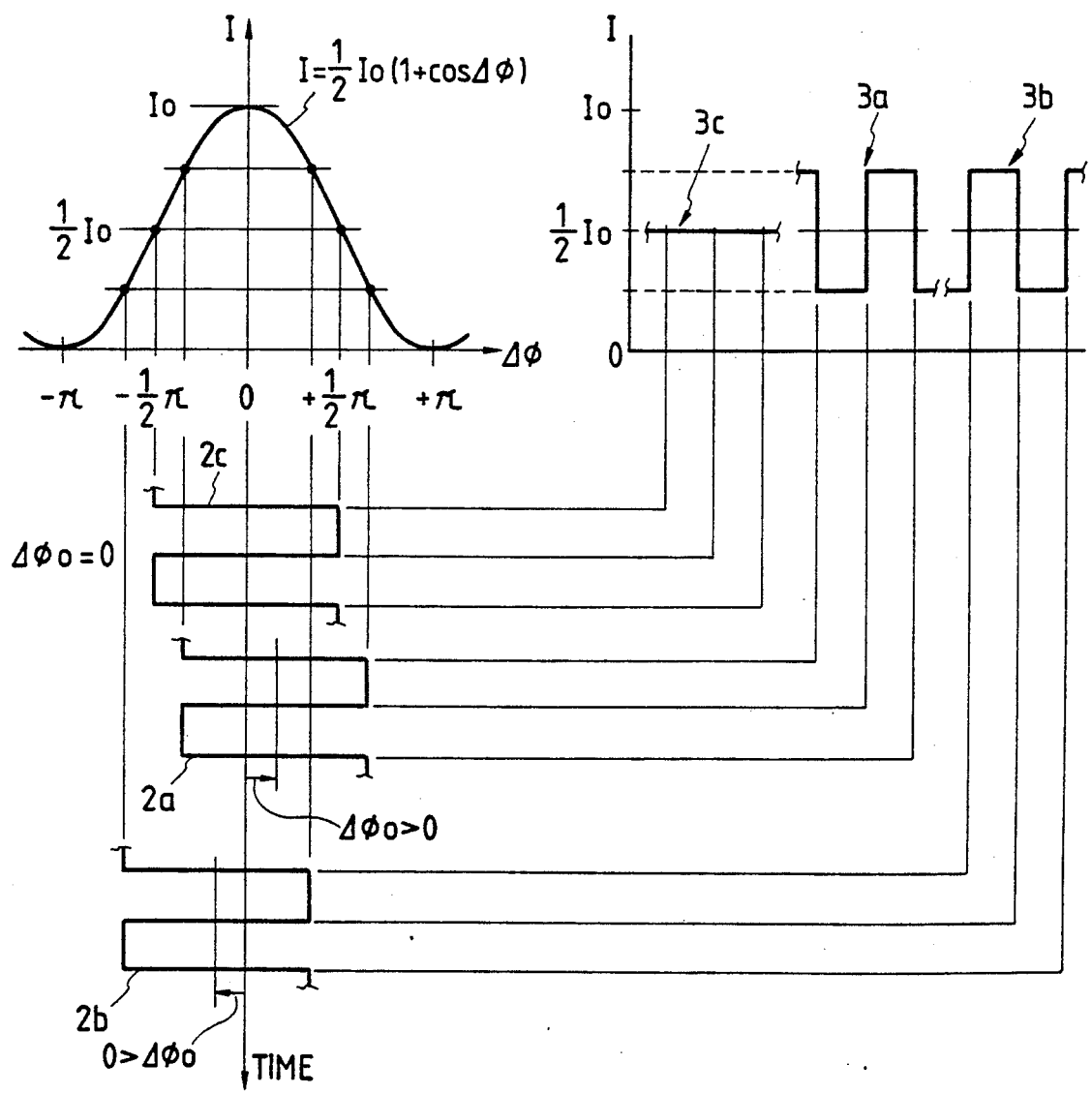
FIG. 8 is a diagram showing variations in the phase difference between two rays of light phase-modulated by the biasing voltage and variations in the intensity of interference light.

The intensity I of the interference light 9 obtainable from the optical coupler 15 is expressed, by the following equation, as a function of the total phase difference $\Delta\phi$ between the two rays of light 7a and 7b which interfere with each other in the optical coupler 15:

$$I = \tfrac{1}{2} Io(1 + \cos\Delta\phi) \qquad (10)$$

where Io is the highest intensity of the interference light 9. When the phase difference $\Delta\phi_0$ which is the sum of the Sagnac phase difference $\Delta\phi_s$ and the ramp phase difference $\Delta\phi_r$, which is caused by the application of the ramp voltage Ra to the ramp phase modulator 22, satisfied $\sin\Delta\phi_0=0$, for example, when $\Delta\phi_0=0$, the total phase difference $\Delta\phi$ varies binary-wise to $\pm\pi/2$ about $\Delta\phi=0$ in the period Pa in FIG. 4, as indicated by the line 2c in FIG. 8, as a result of a phase modulation $\pm\pi/2$ in the biasing phase modulator 21 by the biasing voltage Bi which is a rectangular voltage. In consequence, the intensity I of the interference light 9 is made constant as indicated by the line 3c in FIG. 8. When the phase difference $\Delta\phi_0$ is not zero but positive or negative in the above-mentioned period Pa, the total phase difference $\Delta\phi$ varies binary-wise about the positive or negative phase difference $\Delta\phi_0$ as indicated by the line 2a or 2b in FIG. 8 and the intensity I of the interference light 9 varies binary-wise in accordance with the polarity and magnitude of the phase difference $\Delta\phi_0$ as indicated by the line 3a or 3b in FIG. 8.

In the phase difference detect/control unit 50 the component of the frequency fm of the biasing voltage Bi in the output Va of the photodetector 19 for detecting the interference light 9 of the varying intensity I is converted by the frequency mixer 51 into an intermediate-frequency signal of the frequency fr and is then synchronously detected by the synchronous detector 54 with the reference signal Sr of the frequency fr, as described above. By this, the component of the frequency fm of the biasing voltage Bi in the output Va of the photodetector 19 is equivalently subjected to a synchronous detection by the biasing voltage Bi, and in consequence, the detected output expressed by Eq. (9) is obtained as the output Vd of the synchronous detector 54.

According to the present invention, a peak value controller 60 is provided in association with the ramp voltage generator 40. The peak value controller 60 in this example comprises: a voltage source 61 for obtaining a positive voltage +Vpo; a voltage source 62 for obtaining a negative voltage −Vmo; a synchronous detector 63 for synchronously detecting the output Va of the photodetector 19 with the biasing voltage Bi available from the signal generator 30; a buffer amplifier 64 which is supplied with the output Vo of the synchronous detector 63; a positive increment detector 65 for detecting a positive increment in the output Vo of the synchronous detector 63 provided via the buffer amplifier 64; a negative increment detector 66 for detecting a negative increment in the output Vo of the synchronous detector 63 provided via the buffer amplifier 64; an adder 67 for adding together the output Vx of the positive increment detector 65 and the output Vy of the negative increment detector 66; an integration circuit 68 for integrating the output Vz of the adder 67; an adder 71 for adding the output voltage Vt of the integration circuit 68, as a correction voltage, to the voltage +Vpo available from the voltage source 61; and an adder 72 for adding the output voltage Vt of the integration circuit 68, as a correction voltage, to the voltage −Vmo available from the voltage source 62. The output voltages of the adders 71 and 72 are used as the aforementioned reference voltages +Vpr and −Vmr for the voltage comparators 45 and 46 in the ramp voltage generator 40, respectively.

The voltages +Vpo and −Vmo are set so that when the temperature of the fiber optic gyro is, for example, 15° C. which is a standard temperature, the output voltage Vt of the integration circuit 68 is reduced to zero as described later on. That is, the voltages +Vpo and −Vmo are set to such values that when the ramp voltage Ra obtained by applying the voltages +Vpo and −Vmo intact as the reference voltages +Vpr and −Vmr to the ramp voltage generator 40 at the standard temperature 15° C. is positive and negative, the maximum phase shifts of light in the ramp phase modulator 22 may be +2πrad. and −2πrad.

The positive increment detector 65 is formed by connecting an operational amplifier 81, a capacitor 82 and a diode 83 as shown. The negative increment detector 66 is formed by connecting an operational amplifier 84, a capacitor 85 and a diode 86 as shown. The adder 67 is formed by connecting an operational amplifier 87 and resistors 88x, 88y and 89 as shown.

Figure 9:
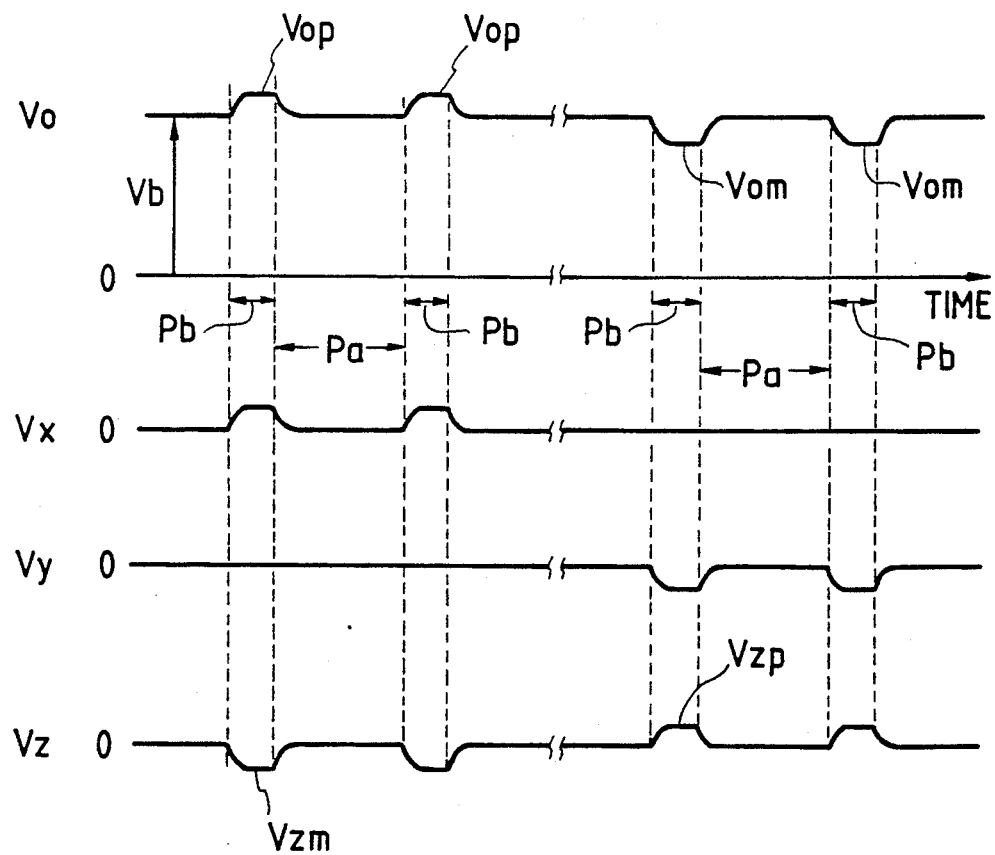
FIG. 9 is a diagram showing voltage waveforms occurring at typical circuit points of a peak value controller.

In the peak value controller 60 of this embodiment, when neither positive nor negative increment is introduced into the output Vo of the synchronous detector 63, a bias component Vb of the output Vo is stored in the capacitor 82 of the positive increment detector 65 and the capacitor 85 of the negative increment detector 66. When a positive increment Vop appears in the output Vo of the synchronous detector 63 as shown at the left-hand side in FIG. 9, the operational amplifiers 81 and 84 produce negative outputs to turn OFF the diode 83 and ON the diode 86 while the positive increment Vop appears. Consequently, the positive increment Vop in the output Vo of the synchronous detector 63 appears intact as the output Vx of the positive increment detector 65, whereas the output Vy of the negative increment detector 66 is reduced to zero (the ground potential), with the result that a negative component Vzm is developed in the output Vz of the adder 67, making the output voltage Vt of the integration circuit 68 positive. Conversely, when a negative increment Vom is introduced into the output Vo of the synchronous detector 63 as shown at the right-hand side in FIG. 9, the operational amplifiers 81 and 84 produce positive outputs to keep the diode 83 in the ON state and the diode 86 in the OFF state while the negative increment Vom appears. Consequently, the output Vx of the positive increment detector 65 is reduced to zero, whereas the negative increment Vom in the output Vo of the synchronous detector 63 appears intact as the output Vy of the negative increment detector 65, thereby creating a positive component Vzp in the output Vz of the adder 67 to make the output voltage Vt of the integration circuit 68 negative. When neither of positive and negative increments is contained in the output Vo of the synchronous detector 63, the outputs Vx and Vy of the positive and negative increment detectors 65 and 66 are both reduced to zero, and hence neither negative nor positive component is produced in the output Vz of the adder 67, causing the output voltage Vt of the integration circuit 68 to become zero.

Now, let it be assumed that the light 7a and the light 7b interfering with each other in the optical coupler 15 are phase-modulated by the biasing voltage Bi in the biasing phase modulator 21 to provide therebetween a phase difference of ±π/2 rad. (the phase difference and the phase shift are expressed in radian, but in the following description the unit will be omitted for the sake of brevity), an that the polarity and the frequency $f_R$ of the ramp voltage Ra, which is applied from the ramp voltage generator 40 to the ramp phase modulator 22, are controlled by the phase difference detect/control unit 50 so that the phase difference $\Delta\phi_0$ expressed by Ex. (1) may be zero (i.e. $\Delta\phi_s = -\Delta\phi_r$).

Figure 2:
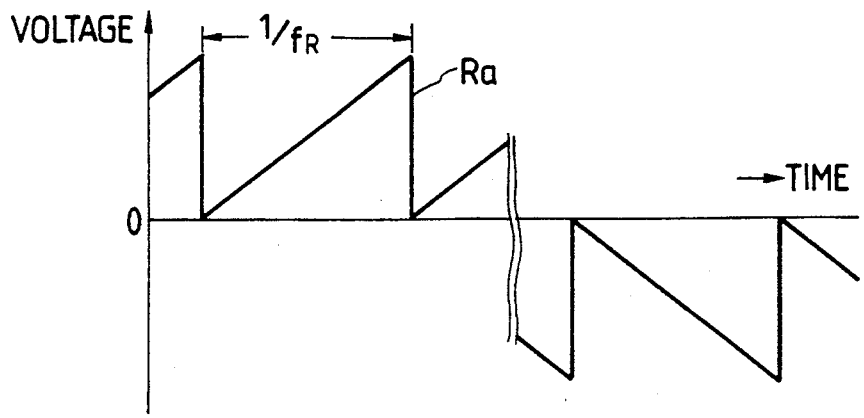
FIG. 2 is a waveform diagram showing a ramp voltage.
Figure 3:
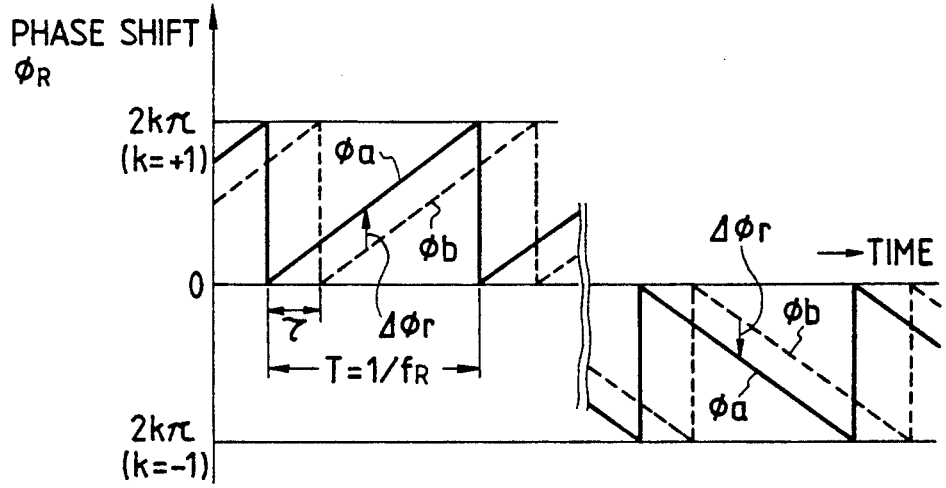
FIG. 3 is a diagram showing phase shifts which are provided by a ramp phase modulator to two rays of light opposite in direction.
Figure 10:
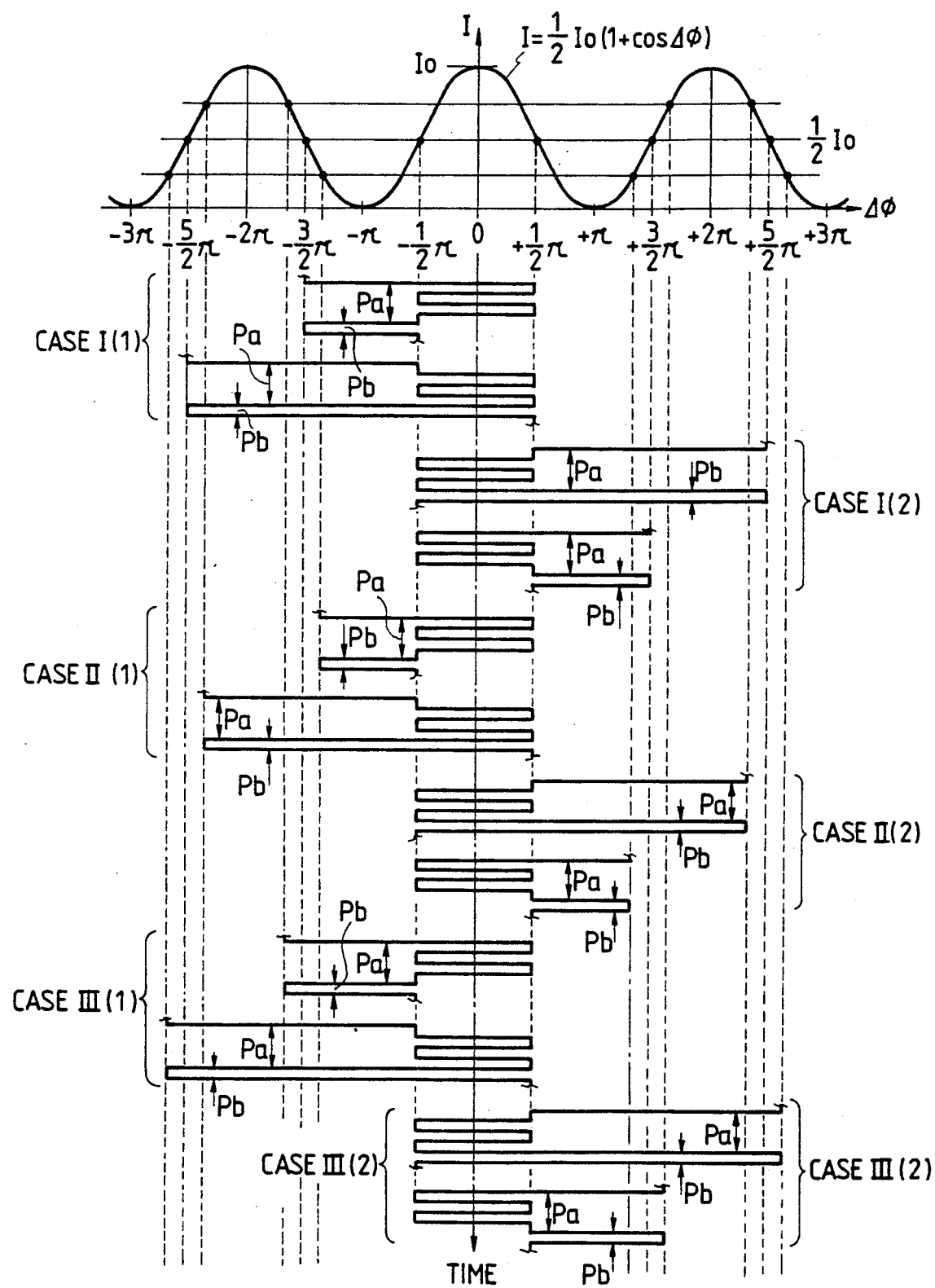
FIG. 10 is a diagram showing variations in total phase difference between two rays of light interfering with each other in various cases.

CASE I: Consider that the temperature of the fiber optic gyro is in agreement with the afore-mentioned standard temperature. (Hence, the absolute value of the maximum ramp phase shift, $|\phi_R|_{max}$, of light by the ramp phase modulator 22 is $2\pi$.) In this instance, the total phase difference between the light 7a and the light 7b interfering with each other in the optical coupler 15 varies as indicated by CASE 1(1) in FIG. 10 when the input angular rate $\Omega$ is applied clockwise, i.e. in the negative direction and the Sagnac phase difference $\Delta\phi_s$ is negative (in which case the ramp voltage Ra is positive as shown at the left-hand side in FIG. 2 and the ramp phase shift $\phi_R$ goes positive as shown at the left-hand side in FIG. 3). In CASE I(1) there are shown separately two cases where the phase difference $\Delta\phi_B$ by the biasing phase modulator 21 in the period Pb is +π/2 and −π/2. This applies to other cases described hereinbelow. When the input angular rate $\Omega$ is applied counterclockwise, i.e. in the positive direction and the Sagnac phase difference $\Delta\phi_s$ is positive (in which case the ramp voltage Ra is negative as shown at the right-hand side in FIG. 2 and the ramp phase shift $\phi_R$ goes negative as shown at the right-hand side in FIG. 3), the total phase difference $\Delta\phi$ varies as indicated by CASE I(2) in FIG. 10.

CASE II: In the case where the temperature of the fiber i=optic gyro is lower than the standard temperature and the absolute value of the maximum phase shift $|\phi_R|_{max}$, of light in the ramp phase modulator 22 becomes smaller than $2\pi$ owing to a change in the constant of the ramp phase modulator 22 by a temperature change, the total phase difference $\Delta\phi$ between the light 7a and 7b interfering with each other in the optical coupler 15 undergoes such variations as indicated by CASE II(1) in FIG. 10 when the ramp phase shift $\phi_R$ goes positive as shown at the left-hand side in FIG. 3). When the ramp phase shift $\phi_R$ goes negative as shown at the right-hand side in FIG. 3, the total phase difference $\Delta\phi$ varies as indicated by CASE II(2) in FIG. 10.

CASE III: Conversely, in the case where the temperature of the fiber optic gyro is higher than the standard temperature and the absolute value of the maximum ramp phase shift $|\phi_R|_{max}$, of light in the ramp phase modulator 22 becomes larger than $2\pi$ owing to a change in the constant of the ramp phase modulator 22 by a temperature change, the total phase difference $\Delta\phi$ between the light 7a and the light 7b interfering with each other in the optical coupler 15 varies as indicated by CASE III(1) in FIG. 10 when the ramp phase shift $\phi_R$ goes positive as shown at the left hand side in FIG. 3. When the ramp phase shift $\phi_R$ goes negative as shown at the right-hand side in FIG. 3, the total phase difference $\Delta\phi$ varies as indicated by CASE III(2) in FIG. 10.

Figure 11:
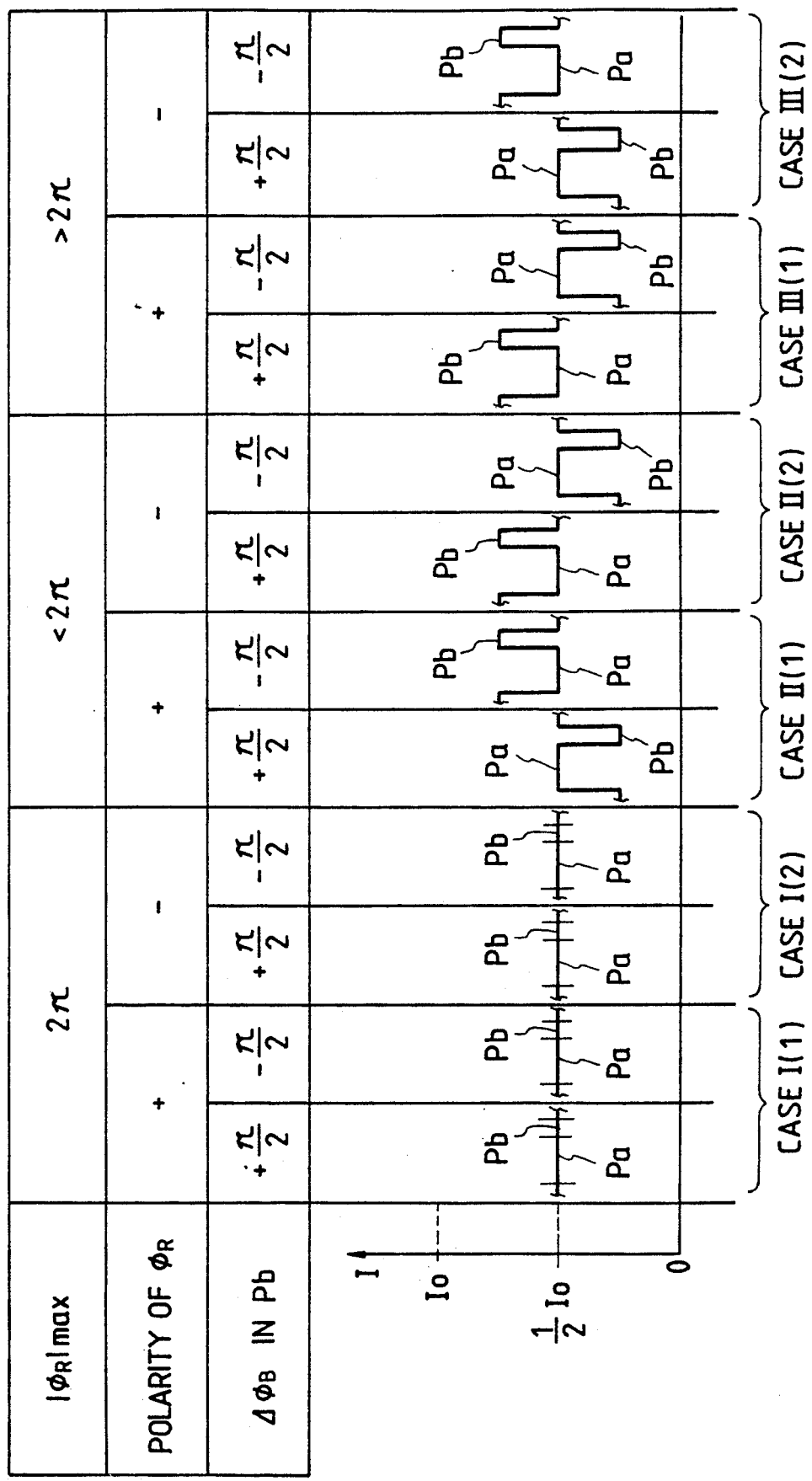
FIG. 11 is a diagram showing variations in the intensity of the interference light in various cases.

Accordingly, the intensity I of the interference light 9 from the optical coupler 15 becomes such as shown in FIG. 11 in each of the above-mentioned cases.

That is, in the case where the temperature of the fiber optic gyro is equal to the standard temperature and the peak ramp phase shift of light in the ramp phase modulator 22 becomes $+2\pi$ or $-2\pi$, the intensity I of the interference light 9 is constant in both of the periods Pa and Pb when the ramp phase shift $\phi_R$ is positive as CASE I(1) or negative as in CASE I(2), regardless of whether the phase difference $\Delta\phi_B$ by the biasing voltage Bi is $+\pi/2$ or $-\pi/2$.

In the case where the temperature of the fiber optic gyro is lower than the standard temperature and consequently the absolute value of the maximum ramp phase shift, $|\phi_R|_{max}$, of light in the ramp phase modulator 22 is smaller than $2\pi$, the intensity I of the interference light 9 is low in the period Pb when the ramp phase shift $\phi_R$ is positive and the biasing voltage Bi provides the phase difference $+\pi/2$ in the period Pb, and when the biasing voltage Bi provides the phase difference $-\pi/2$, the intensity I of the interference light 9 rises in the period Pb as indicated by CASE II(1). Conversely, in the case where the ramp phase shift $\phi_R$ goes negative as indicated by CASE II(2), when the biasing voltage Bi provides the phase difference $+\pi/2$ in the period Pb the intensity I of the interference light 9 increases in the period Pb, and when the biasing voltage Bi provides the phase difference $-\pi/2$, the intensity I of the interference light 9 decreases in the period Pb.

In the case where the temperature of the fiber optic gyro is higher than the standard temperature and the absolute value of the maximum ramp phase shift, $|\phi_R|_{max}$, of light in the ramp phase modulator 22 becomes larger than $2\pi$, if the ramp phase shift $\phi_R$ is positive as indicated by CASE III(1) the intensity I of the interference light 9 increases in the period Pb when the biasing voltage Bi provides the phase difference $+\pi/2$ in the period Pb, and when the biasing voltage Bi provides the phase difference $-\pi/2$, the intensity I of the interference light 9 decreases in the period Pb as in CASE II(2). Where the ramp phase difference $\phi_R$ goes negative as indicated by CASE III(2), the intensity I of the interference light 9 decreases in the period Pb when the biasing voltage Bi provides the phase difference $+\pi/2$ as in CASE II(2), and when the biasing voltage Bi provides the phase difference $-\pi/2$, the intensity I of the interference light 9 increases in the period Pb as in CASE II(1).

As described above, in the case where the temperature of the fiber optic gyro is equal to the standard temperature and the absolute value of the maximum ramp phase shift, $|\phi_R|_{max}$, of light by the ramp phase modulator 22 becomes $2\pi$, neither positive nor negative increment is introduced into the output Vo of the synchronous detector 63 in the peak value controller 60 regardless of whether the ramp phase shift $\phi_R$ goes positive as in CASE I(1) or negative as in CASE I(2). In the case where the temperature of the fiber optic gyro is lower than the standard temperature and the absolute value of the maximum ramp phase shift, $|\phi_R|_{max}$, of light by the ramp phase modulator 22 becomes smaller than $2\pi$, if the ramp phase shift $\phi_R$ goes positive as in CASE II(1), the positive increment Vop of a level corresponding the deviation of the absolute value of the maximum ramp phase shift, $|\phi_{Rmax}$, of light by the ramp phase modulator 22 from $2\pi$ is produced in the output Vo of the synchronous detector 63 in the period Pb as shown at the left-hand side in FIG. 9 (the phase of the biasing voltage Bi which is applied to the synchronous detector 63 being pre-adjusted so that the positive increment is produced). When the ramp phase shift $\phi_R$ goes negative as in CASE II(2), the negative increment Vom of a level corresponding to the deviation of the absolute value of the maximum ramp phase shift, $|\phi_R|_{max}$, of light by the ramp phase modulator 22 from $2\pi$ is produced in the output Vo of the synchronous detector 63 in the period Pb as shown at the right-hand side in FIG. 9.

In the case where the temperature of the fiber optic gyro is higher than the standard temperature and the absolute value of the maximum ramp phase shift, $|\phi_R|_{max}$, of light by the ramp phase modulator 22 becomes greater than $2\pi$, if the ramp phase shift $\phi_R$ goes positive as in CASE III(1), the negative increment Vom of a level corresponding to the deviation of the absolute value of the maximum ramp phase shift, $|\phi_R|_{max}$, of light by the ramp phase modulator 22 from $2\pi$ is produced in the output Vo of the synchronous detector 63 in the period Pb. When the ramp phase shift $\phi_R$ goes negative as in CASE III(2), the positive increment Vop of a level corresponding to the deviation of the absolute value of the maximum ramp phase shift, $|\phi_R|_{max}$, of light by the ramp phase modulator 22 from $2\pi$ is produced in the output Vo of the synchronous detector 63 in the period Pb.

In the peak value controller 60, as described above, when neither positive nor negative increment is developed in the output Vo of the synchronous detector 63, the output voltage Vt of the integration circuit 68 is reduced to zero, and when the positive increment Vop is developed in the output Vo of the synchronous detector 63, the output voltage Vt of the integration circuit 68 goes positive at a level corresponding to that of the positive increment Vop. When the negative increment Vom is produced in the output Vo of the synchronous detector 63, the output voltage Vt of the integration circuit 68 goes negative at a level corresponding to that of the negative increment Vom.

Consequently, in the case where the temperature of the fiber optic gyro is equal to the standard temperature and the maximum phase shift by the ramp phase modulator 22 becomes $+2\pi$ or $-2\pi$, the output voltages of the adders 71 and 72 in the peak value controller 60, that is, the reference voltages $+Vpr$ and $-Vmr$ for the voltage comparators 45 and 46 in the ramp voltage generator 40 are equal to the voltages $+Vop$ and $-Vom$ from the voltage sources 61 and 62 in the peak value controller 60, respectively, regardless of whether the ramp phase shift $\phi_R$ is positive as in CASE I(1) or negative as in CASE I(2), and as will be seen from the above, the peak ramp phase shift of light by the ramp phase modulator 22 is held at $+2\pi$ or $-2\pi$.

In the case where the temperature of the fiber optic gyro is lower than the standard temperature and the absolute value of the maximum ramp phase shift by the ramp phase modulator 22 becomes smaller than $2\pi$ owing to a change in the constant of the ramp phase modulator 22 by a temperature change, if the ramp voltage Ra is made positive and the ramp phase shift $\phi_R$ goes positive as in CASE II(1), the reference value $+V_{pr}$ for the voltage comparator 45, that is, the maximum value of the positive ramp voltage Ra becomes a value higher than the voltage $+V_{po}$ from the voltage source 61 and corresponding to the deviation of the absolute value of the maximum ramp phase shift of light by the ramp phase modulator 22 from $2\pi$. When the ramp voltage Ra is made negative and the ramp phase shift $\phi_R$ goes negative as in CASE II(2), the peak value of the ramp voltage Ra is made large so that the reference voltage $-V_{mr}$ for the voltage comparator 46, that is, the minimum value of the negative ramp voltage Ra becomes a value lower than voltage $-V_{mo}$ from the voltage source 62 and corresponding to the deviation of the absolute value of the maximum ramp phase shift of light by the ramp phase modulator 22 from $2\pi$, and as a result of this, the peak ramp phase shift of light by the ramp phase modulator 22 becomes $+2\pi$ or $-2\pi$.

Conversely, in the case where the temperature of the fiber optic gyro is higher than the standard temperature and the absolute value of the maximum ramp phase shift of light by the ramp phase modulator 22 becomes greater than $2\pi$ owing to a change in the constant of the ramp phase modulator 22 by a temperature change, if the ramp voltage Ra is made positive and the ramp phase shift $\phi_R$ goes positive as in CASE III(1), the reference voltage $+V_{pr}$ for the voltage comparator 45, that is, the maximum value of the positive ramp voltage Ra becomes a value lower than the voltage $+V_{po}$ from the voltage source 61 and corresponding to the deviation of the absolute value of the maximum ramp phase shift of light by the ramp phase modulator 22 from $2\pi$. When the ramp voltage Ra is made negative and the ramp phase shift $\phi_R$ goes negative as in CASE III(2), the peak value of the ramp voltage Ra is decreased so that the reference voltage $-V_{mr}$ for the voltage comparator 46, i.e. the minimum value of the negative ramp voltage Ra may become a value higher than the voltage $-V_{mo}$ from the voltage source 62 and corresponding to the deviation of the absolute value of the maximum ramp phase shift of light by the ramp phase modulator 22 from $2\pi$, and as a result of this, the peak ramp phase shift of light by the ramp phase modulator 22 becomes $+2\pi$ or $-2\pi$.

Thus, in the above-described fiber optic gyro, the peak ramp phase shift of light by the ramp phase modulator 22 is held at $\pm 2\pi$ over the entire temperature range; so that the scale factor error is markedly reduced which is induced in the output of the fiber optic gyro by a change in the constant of the ramp phase modulator 22 owing to a temperature change More specifically, the deviation of the peak ramp phase shift of light by the ramp phase modulator 22 from $\pm 2\pi$ is reduced to $\pm 0.3\%$ or less over the entire temperature range and the above-mentioned scale factor error is reduced to $\pm 0.01\%$ or less over the entire temperature range.

While in the phase difference detect/control unit 50 the component of the frequency fm of the biasing voltage Bi, contained in the output Va of the photodetector 19, is synchronously detected by the reference signal Sr of the frequency fr as described previously, it is also possible that the output Va of the photodetector 19 is synchronously detected directly by the biasing voltage Bi or a rectangular signal of the same frequency as that of the biasing voltage Bi or that a component of a frequency equal to an odd-numbered multiple of the frequency fm of the biasing voltage Bi, contained in the output Va of the photodetector 19, is synchronously detected by a reference signal of the same frequency. Where the output Va of the photodetector 19 is synchronously detected directly by the biasing voltage Bi or a rectangular signal of the same frequency, the synchronous detector therefor can be used as the synchronous detector 63 in the peak value controller 60 as well.

The PID filter 55 in the phase difference detect/control unit 50 may be substituted with a filter having the same function as that of the filter 55.

The positive increment detector 65, the negative increment detector 66 and the adder 67 in the peak value controller 60 are to detect and add the positive and negative increments Vop and Vom in the output Vo of the synchronous detector 63 regardless of variations of the bias component Vb in the output Vo, and their concrete circuit arrangements are not limited specifically to those shown in the drawings. The same is true of the integration circuit 68.

As described above, according to the present invention, the scale factor which is induced in the output of the fiber optic gyro owing to a change in the constant of the ramp phase modulator by a temperature change can be reduced materially by using a rectangular voltage as the biasing voltage and by providing a special peak value controller.

It will be apparent that many modifications and variations may be effected without departing from the scope of the novel concepts of the present invention.

What is claimed is:

1. A fiber optic gyro comprising:
   a light source;
   an optical fiber coil;
   an optical coupler for splitting light from said light source into two rays of light and supplying them to said optical fiber coil at the one end and the other end thereof and for coupling two rays of light having propagated through said optical fiber coil and causing them to interfere with each other;
   a photodetector for detecting said interference light available from said optical coupler;
   a biasing phase modulator disposed between said optical coupler and the one end of said optical fiber coil;
   a biasing voltage generator for generating a biasing voltage for phase modulation use which is applied to said biasing phase modulator;
   a ramp phase modulator disposed between said optical coupler and the other end of said optical fiber coil;
   a ramp voltage generator for generating a ramp voltage for phase modulation use which is applied to said ramp phase modulator;
   a phase difference detect/control unit for detecting, from the output of said photodetector, a phase difference between said two rays of light interfering with each other in said optical coupler and whereby the polarity and frequency of said ramp voltage which is generated by said ramp voltage generator are controlled by said detected output so that said phase difference may reach a predetermined value; and
   a peak value controller whereby a deviation of a maximum ramp phase shift of light by said ramp phase modulator from $2k\pi$ rad. is detected from the output of said photodetector, k being an integer, and whereby the peak value of said ramp voltage which is generated by said ramp voltage generator is controlled o that said deviation may be reduced to zero.

2. The fiber optic gyro of claim 1, wherein said biasing voltage generator generates a rectangular voltage, wherein said peak value controller includes a synchronous detector for synchronously detecting the output of said photodetector by a rectangular signal corresponding to said biasing voltage, a positive increment detector for detecting a positive increment in the output of said synchronous detector, a negative increment detector for detecting a negative increment in the output of said synchronous detector, an adder for adding together the outputs of said positive increment detector and said negative increment detector, and reference voltage generating means for generating a reference voltage of a magnitude corresponding to the output of said adder, and wherein said ramp voltage generator generates said ramp voltage using said reference voltage as said peak value.

3. The fiber optic gyro of claim 2, wherein said reference voltage generating means includes an integration circuit for integrating the output of said adder, first and second voltage sources for generating positive and negative first and second voltages of predetermined magnitudes, and first and second adders for adding the output of said integration circuit and said first and second voltages to generate positive and negative reference voltages, said positive and negative reference voltages defining positive and negative peak values of said ramp voltage.

4. The fiber optic gyro of claim 1, 2, or 3, wherein said biasing voltage generator generates said biasing voltage of a first frequency the half period of which is the time for the propagation of light through said optical fiber coil from the one end to the other end thereof, and wherein said phase difference detect/control unit includes frequency converting means for converting the output of said photodetector into an intermediate-frequency signal of a second frequency lower than said first frequency, and synchronous detecting means for synchronously detecting said intermediate-frequency signal by said reference signal of said second frequency to obtain a detected output corresponding to a phase difference between said two rays of light.

* * * * *